May 7, 1968　　　W. P. McILRATH　　　3,381,383
TRACK GAUGER
Filed April 29, 1966　　　2 Sheets-Sheet 1
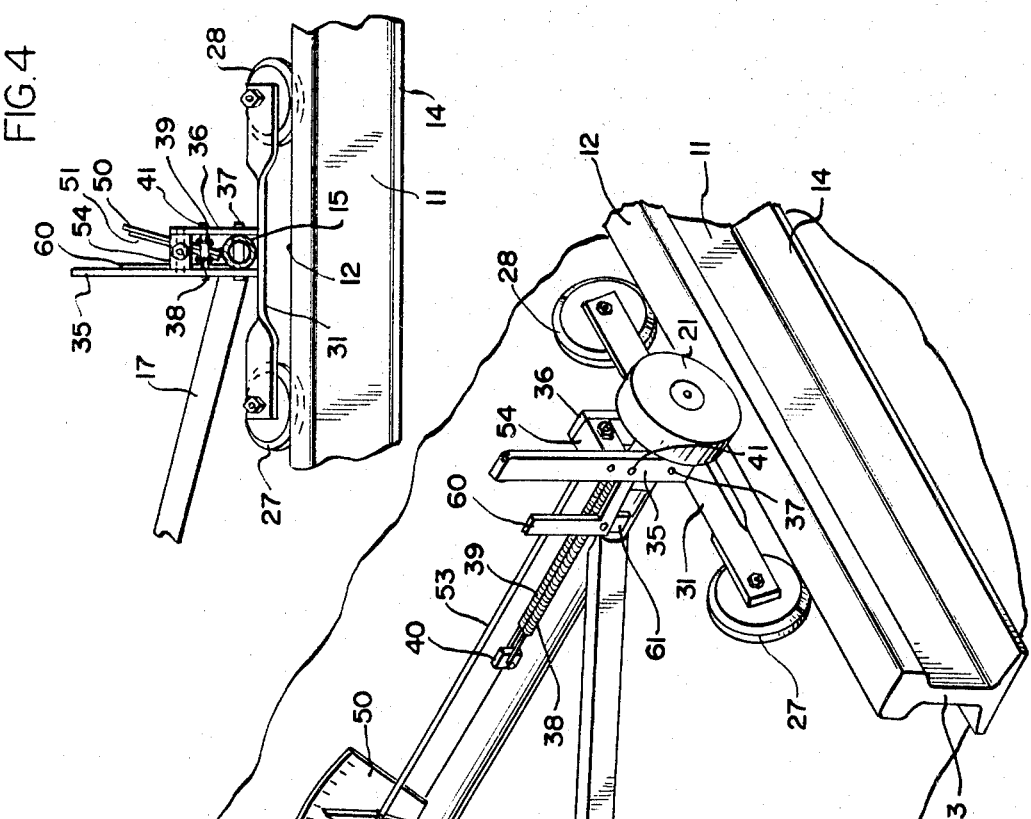
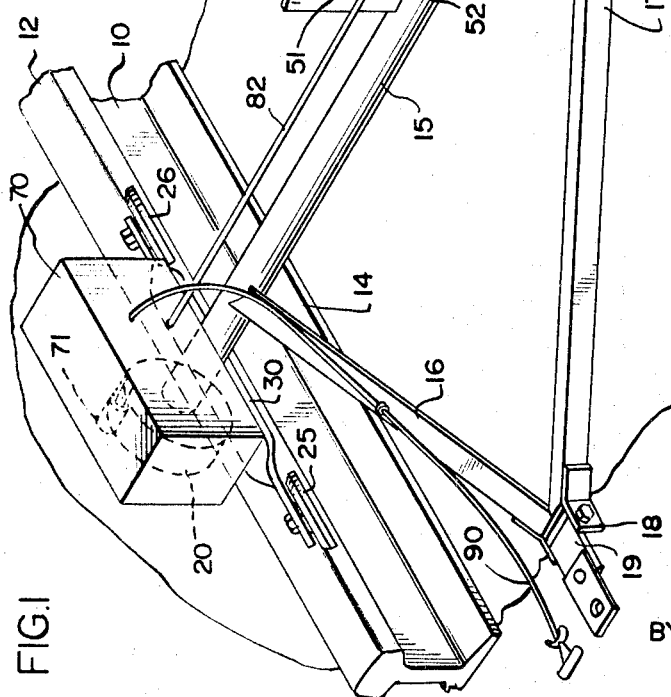
INVENTOR
WILLIAM P. McILRATH
BY Hofgren, Wegner, Allen,
Stellman & McCord
ATTORNEYS May 7, 1968     W. P. McILRATH     3,381,383
TRACK GAUGER
Filed April 29, 1966             2 Sheets—Sheet 2
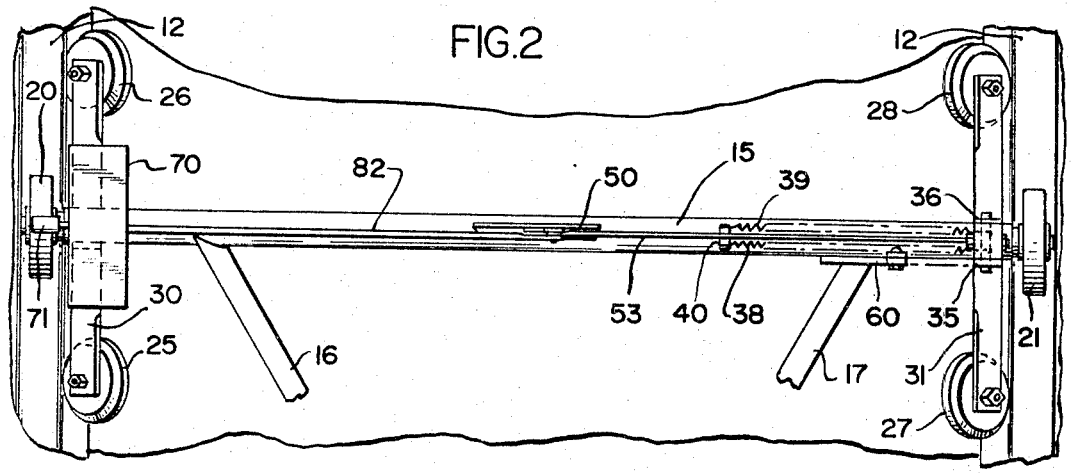
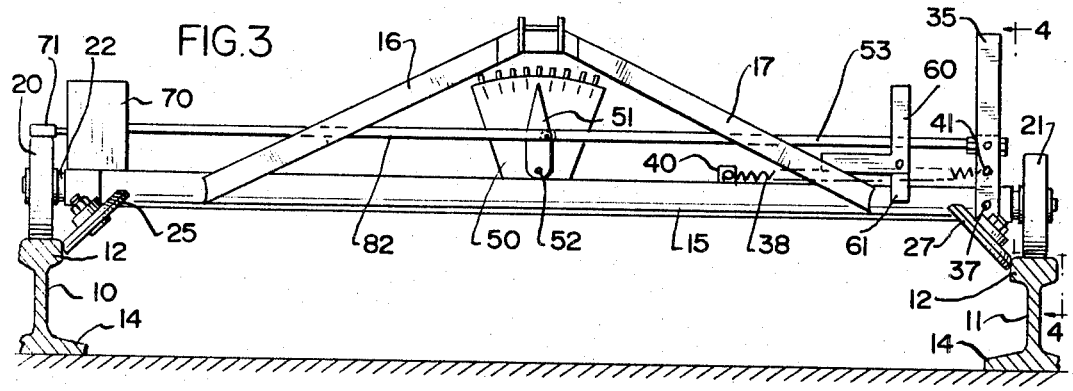
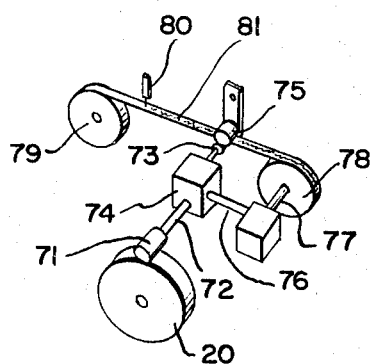
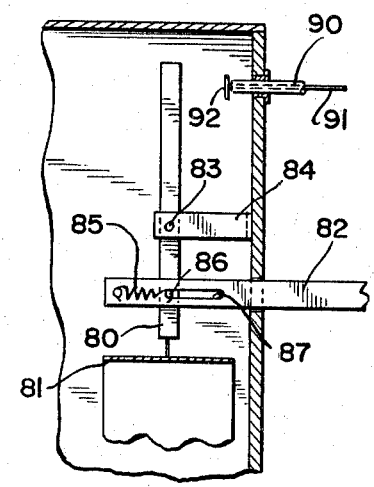

//  # United States Patent Office 3,381,383
Patented May 7, 1968

3,381,383
TRACK GAUGER
William P. McIlrath, Racine, Wis., assignor to Racine Hydraulics & Machinery, Inc., a corporation of Wisconsin
Filed Apr. 29, 1966, Ser. No. 546,392
5 Claims. (Cl. 33—146)

ABSTRACT OF THE DISCLOSURE

A track gauger for checking a railroad track gauge in which a frame mounts a pair of track-engaging wheels for support of the unit for movement along a track and with gauge mechanism for operating a pointer to give a visual indication of the track gauge and with tape recording mechanism to make a permanent record of the track gauge, with structure for marking the tape at spaced points with indicia indicative of mile posts encountered as the gauger moves along the track so that the permanent record of the track gauge will have meaning when examined.

---

This invention relates to a track gauger and, more particularly, to a track gauger for checking a railroad track gauge.

An object of this invention is to provide an economical, lightweight and easily-serviced track gauger that can be towed behind a powered vehicle moving along a railroad track to visually check the track gauge.

Another object of the invention is to provide a track gauger as defined in the preceding paragraph wherein not only may the track gauge be visually checked, but also a record can be made of the variations in the gauge along with means for giving an indication of the mile posts that are passed so that the tape on which the gauge variations are recorded will have reference points to indicate the location of any gauge deviation in later examining the tape.

Still another object of the invention is to provide a track gauger in which a frame has a cross member of tubular construction mounting bearings at opposite ends for running wheels and with gauge wheels at opposite ends of the cross member with one gauge wheel being movably mounted and spring urged against the head of a rail, an indicator dial on the frame and a pointer movable relative to the dial, with motion transmitting means between the movable gauge wheel and the pointer to give a visual indication of the variations in the width between the rails, with the pivot mountings for the movable parts being open and exposed for easy repair and lubrication.

Still another object of the invention is to provide a track gauger having a frame with running wheels on the frame for engagement with track rails, track gauge means on the frame including a movable gauge wheel, an indicator dial on the frame with a pointer movably associated therewith, a motion transmitting connection between the movable gauge wheel and the pointer whereby the detection of the variation in gauge is indicated by the pointer on the dial, means for recording the variations in the spacing including a tape recorder having means for driving a tape proportionally to the rate of movement of the track gauger along the rail, a recorder pen associated with the tape, means connecting the pen for movement with the tape, and manually operable means to make an indication on the tape by shifting of the recorder pen which serves as the reference point in subsequently reading the tape as the indication can be made as each mile post is passed.

Further objects and advantages will become apparent from the following detailed description taken in connection with the accompanying drawings in which:

FIG. 1 is a perspective view of the track gauger shown in association with a railroad track, preparatory to use;

FIG. 2 is a fragmentary plan view of the track gauger shown in a position similar to that of FIG. 1 and ready for use;

FIG. 3 is a front elevational view of the track gauger supported on a pair of rails;

FIG. 4 is a vertical section, taken generally along the line 4—4 in FIG. 3;

FIG. 5 is a diagrammatic view of the tape drive mechanism; and

FIG. 6 is a fragmentary vertical section showing the recorder pen and associated mechanism in association with a tape.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

The track gauger is shown in association with a railroad track in FIG. 1 with the track having a pair of rails 10 and 11 of conventional construction, having a head 12, a web 13, and a base 14. The gauger comprises a frame having a cross member 15 formed of tubular stock, with a pair of forwardly extending braces 16 and 17 secured to the cross member as by welding and angling forwardly toward each other for connection and attachment to a bracket 18 having a pivoted tongue 19 providing for adjustable connection of the gauger to a powered vehicle, such as a motor car which pulls the track gauger along the track. The brace members 16 and 17 can each mount a heavy weight, if desired, to keep the track gauger firmly engaged on the rails.

A pair of rubber-tired running wheels 20 and 21 extend from opposite ends of the cross member and rest on the rail heads for support of the track gauger. The cross member 15, at its opposite ends, has suitable bearing members, as indicated at 22, inserted therein to provide the rotatable mounting for the running wheels.

The track gauger carries structure for detecting variations from the standard track gauge, comprising a series of gauge wheels with there being a pair of gauge wheels 25 and 26 at one end of the cross member and a second pair 27, 28 at the other end of the cross member. The gauge wheels 25 and 26 are affixed to the cross member by rotatable mounting on a plate 30 affixed to the cross member and mounting the gauge wheels 25 and 26 thereto by insulating mountings. The gauge wheels 27 and 28 are movable relative to the frame and are rotatably mounted by means of insulating mounts to a plate 31 pivotally mounted to the opposite end of the cross member. The plates 30 and 31 have the end portions twisted from the plane of the plate to provide mountings for the gauge wheels which cause the gauge wheels to angle outwardly into engagement with the rail heads, as seen clearly in FIG. 3.

The plate 31 mounting the gauge wheels 27 and 28 is movably mounted to the cross member 15 by a pair of spaced mounting plates 35 and 36, shown particularly in FIG. 4, which lie to the outside of and are pivoted to the cross member 15 by a pivot pin 37 extending through these parts, as shown in FIG. 4. The pin 37 can be held in association with the parts by suitable removable fasteners, such as cotter pins. The movable gauge wheels 27 and 28 are urged outwardly against the rail by means of a pair of tension springs 38 and 39 overlying the cross member and each having one of their ends connected to a bracket 40 extending upwardly from the cross member, as seen in FIGS. 1, 2 and 3 and each having its other end connected to a second pin 41 extending between the mounting plates 35 and 36 above pivot pin 37, and as shown in FIG. 4. This pin is also held to the plates by means of cotter pins. The tension springs 38 and 39 act on the plates 35 and 36 to pivot them in a counterclockwise direction, as viewed in FIG. 3 to urge the gauge wheels 27 and 28 outwardly against the rail.

The position of the gauge wheels 27 and 28 is indicated on a dial 50 extending upwardly from a central position midway between the ends of the cross member 15. The dial has suitable indicia with a center marking indicating accurate gauge and indicia to either side of the central position indicating either plus or minus variation from the standard gauge. A pointer 51 is pivoted at 52 to the dial and is connected by a motion transmitting link 53 to the mounting plates 35 and 36 by connection to a block 54 pivoted between the plates 35 and 36 on a mounting pin. As the mounting plates 35 and 36 pivot about their mounting pin 37, this motion is transmitted to the pointer 51 which indicates on the dial 50.

The gauge wheels of a pair are spaced from each other a distance sufficient to guide the gauger frame over frogs or switches, without causing derailment of the gauger. As an example, the spacing between wheels is 18″ and the trailing wheels 26 and 28 are thus positioned to guide the track as the leading wheels 25 and 27 enter a frog or switch.

In the event that the track gauger is to be moved from the track, this can easily be done, due to the light weight of the unit and, additionally, the gauge wheels 27 and 28 can be held from extreme movement by means of a lever 60 pivoted to a bracket 61 secured to the cross member 15 and having a first position, shown in FIG. 3, out of obstructing relation with the mounting plates 35 and 36 for the movable gauge wheels. When a limit is to be imposed on the movement of the gauge wheels during removal of the gauger from the track, the lever 60 can be moved to the position shown in FIG. 1 to engage the plate 35 and limit the movement of the plates about the pivot pin 37 under the urging of the springs 38 and 39. Thus, the gauger, as shown in FIG. 1, is in position to operate, but the lever 60 has to be moved to the position shown in FIG. 3 before the gauge of the track can be read.

The pivots for various mechanisms associated with plates 35 and 36 are exposed and can readily be repaired and lubricated.

An added feature of the structure disclosed herein is the ability to make a permanent record of the track gauge readings taken as the gauger moves along the track, with this mechanism embodying a recording unit primarily positioned within a cabinet 70 fastened to the cross member 15 in a position above the fixed gauge wheels 25 and 26 and housing a tape feed mechanism and a recorder pen associated with the tape 81. As shown in FIG. 5, one of the running wheels 20 engages a take-off roller 71 on a shaft 72 which drives a tape capstan 73 through a gear reduction unit 74, with the tape being held against the capstan by a pressure roll 75. A drive including shafts 76 and 77 drives a wind-up roller 78 to wind up the tape as it is fed by the capstan from a supply roll 79. With the drive through the take-off roller 71, the drive of the tape is proportional to the rate of movement of the gauger along the track.

A recording pen 80 is positioned to engage the tape 81 and is connected to the pointer 51 through a link 82 extending into the recorder cabinet whereby lateral movements of the pin along the tape to either side of a central line give an indication of variation in the gauge. The recorder pin 80 is pivotally mounted at 83 to a bracket 84 in the recorder cabinet, and the link 82 is connected to the pen through a yieldable connection 85 to permit movement of the pin independently of the link 82 with a pin 86 on the pen being positioned in a slot 87 in the link 82. This provision for relative movement is provided so that a manual indication can be made on the tape of when the gauger goes by mile posts by a person riding in the vehicle. A Bowden wire, shown in FIG. 1, extends into the recorder cabinet and has an inner wire 91 with a plunger 92 whereby when the inner wire is extended manually the plunger 92 will engage the recorder pen and shift the recorder pen laterally to make a mile post indication on the tape, with this movement being permitted by the yieldable spring 85 engaging the pin 86 on the pen 80.

The foregoing construction provides a lightweight track gauger which can readily be removed from the track and when in use on the track gives a visual indication of proper track gauge or variation therefrom, with provisions for making a permanent record of the visual checking. The track gauger is of a simple, easily-maintained construction and gives full electric signal protection because of the rubber-tired runnnig wheels and insulated gauge wheels 25–28.

I claim:

1. A track gauger comprising, a frame having a tubular cross member, running wheels on said frame for supporting said frame on a pair of rails in position to check the track gauge, bearing means mounted in the opposite ends of said tubular cross member for rotatably supporting said running wheels, two pairs of gauge wheels mounted on said frame to have a pair for engaging each of opposite rail heads, one pair of gauge wheels being fixed to said frame, means movably mounting the other pair of gauge wheels on the frame, a pair of mounting plates extending vertically to either side of said tubular cross member, an exposed pivot pin spanning said plates and tubular cross member, a second pin spanning said plates, spring means connected between said second pin and cross member urging the latter gauge wheels away from the other gauge wheels and toward a rail head, the gauge wheels of each pair being rigidly interconnected and spaced apart a distance sufficient to guide the frame along the track and through frogs or switches without derailment of the gauger, a third pivot pin between said plates, an indicator dial mounted centrally on said frame, a pointer movable across said dial, and a motion transmitting connection between the movable gauge wheels and said pointer to position the pointer in accordance with the spacing between the pairs of gauge wheels and indicate the track gauge and including a rigid link connected to said third pivot pin and extending to said pointer and which is exposed along its length whereby linear movement is not prevented by guide elements subject to rust or corrosion.

2. A track gauger as defined in claim 1 in which a bell-crank lever is pivoted on said cross member for movement between two positions and in one of the positions engages said mounting means to hold the mounting means against the action of the spring means when the track gauger is removed from a track.

3. A track gauger as defined in claim 1 in which means are provided to record the movement of said pointer including a tape moved proportionally to movement of the track gauger along the track, a recorder pen associated with the tape, a motion transmitting connection between said pointer and said pen, and means for marking said tape as spaced points with indicia indicative of mile posts encountered as the gauger moves along the track.

4. A track gauger as defined in claim 3 in which said means for indicating each mile post on said tape includes a manually operable member for selectively shifting said recorder pen toward an edge of the tape which gives a reference point to indicate the location of any track deviation in examining the tape.

5. A track gauger comprising, a frame, running wheels on said frame, track gauge means on said frame including a movable gauge wheel, an indicator dial on said frame, a pointer movably associated with said dial, a motion transmitting connection between said movable gauge wheel and the pointer whereby detection of the variation in gauge is indicated by the pointer, means for recording the variations in rail spacing including a tape recorder having means for driving a tape proportionally to the rate of movement of the track gauger along a rail including a gear reduction unit driven by one of said running wheels, a recorder pen associated with the tape, means connecting the pen for movement with the pointer, and means operable from a remote location associated with said pen to move the pen toward the edge of the tape whereby an operator can shift the pen at each mile post to make an indication on the tape which serves as a reference point in subsequently reading the tape.

References Cited

UNITED STATES PATENTS

| | | | |
|---|---|---|---|
| 674,564 | 5/1901 | Magnuson | 33—146 |
| 705,467 | 7/1902 | Staege | 33—144 |
| 777,066 | 12/1904 | Bohn | 33—146 |
| 824,536 | 6/1906 | Ellis et al. | 33—144 |
| 1,509,141 | 9/1924 | Grovedahl | 33—144 |
| 2,246,430 | 6/1941 | Brumfield | 33—146 |
| 2,507,896 | 5/1950 | Frank | 33—144 |
| 2,679,161 | 5/1954 | Yancey | 346—33 |
| 2,926,984 | 3/1960 | Gerbrands | 346—62 X |

FOREIGN PATENTS

| | | |
|---|---|---|
| 466,135 | 2/1914 | France. |
| 679,655 | 1/1930 | France. |

HARRY N. HAROIAN, *Primary Examiner.*